United States Patent
Sacle et al.

(10) Patent No.: US 8,180,506 B2
(45) Date of Patent: May 15, 2012

(54) FLIGHT MANAGEMENT COMPUTER WITH CONSIDERATION OF APPROACH SPEED CONSTRAINT

(75) Inventors: Jérôme Sacle, Toulouse (FR); François Coulmeau, Seilh (FR)

(73) Assignee: Thales (FR)

( * ) Notice: Subject to any disclaimer, the term of this patent is extended or adjusted under 35 U.S.C. 154(b) by 1077 days.

(21) Appl. No.: 12/041,731

(22) Filed: Mar. 4, 2008

(65) Prior Publication Data

US 2008/0312779 A1 Dec. 18, 2008

(30) Foreign Application Priority Data

Mar. 6, 2007 (FR) .................................... 07 01621

(51) Int. Cl.
*G05D 1/10* (2006.01)
(52) U.S. Cl. ......................................... 701/16; 244/183
(58) Field of Classification Search .............. 701/14–18, 701/206; 244/183
See application file for complete search history.

(56) References Cited

U.S. PATENT DOCUMENTS

| | | | | | |
|---|---|---|---|---|---|
| 3,666,929 | A | * | 5/1972 | Menn .............................. | 701/16 |
| 3,752,967 | A | * | 8/1973 | Vietor ............................. | 701/15 |
| 3,786,505 | A | * | 1/1974 | Rennie ........................... | 342/33 |
| 3,868,497 | A | * | 2/1975 | Vietor ............................ | 701/121 |
| 4,232,839 | A | * | 11/1980 | Sicre et al. .................... | 244/188 |
| 4,633,404 | A | * | 12/1986 | Greeson et al. ................ | 701/3 |
| 4,792,906 | A | * | 12/1988 | King et al. ........................ | 701/5 |
| 4,825,374 | A | * | 4/1989 | King et al. ........................ | 701/5 |
| 5,289,185 | A | * | 2/1994 | Ramier et al. ................. | 340/971 |
| 5,445,021 | A | * | 8/1995 | Cattoen et al. ............. | 73/178 R |
| 6,154,693 | A | * | 11/2000 | Aberschitz et al. ............. | 701/16 |
| 6,633,810 | B1 | | 10/2003 | Qureshi et al. | |
| 7,512,464 | B2 | * | 3/2009 | Tarleton et al. .................. | 701/3 |
| 2006/0265110 | A1 | * | 11/2006 | Ferro et al. ........................ | 701/3 |

FOREIGN PATENT DOCUMENTS

| | | |
|---|---|---|
| EP | 0 256 564 | 2/1998 |
| FR | 2 744 525 | 8/1997 |

OTHER PUBLICATIONS

ARINC Advanced Flight Management Computer System, ARINC Characteristic 720A-2, Published Jun. 30, 2005 by Aeronautical Radio, Inc., Annapolis, Maryland, pp. 1-249.

* cited by examiner

*Primary Examiner* — Mark Hellner
*Assistant Examiner* — Ari M Diacou
(74) *Attorney, Agent, or Firm* — Lowe Hauptman Ham & Berner, LLP

(57) ABSTRACT

The flight management computer discloses and carried onboard an aircraft can be programmed with a newly apparent speed constraint while it ensures the guidance of the aircraft in the course of a landing runway approach. It then takes account of the speed constraint by using it as target speed, when it is greater than an instruction speed which depends on the number of extended flap settings and which corresponds to the addition of a further flap setting. If appropriate, the speed constraint may be bounded below, thus making it possible to remain within the limits of the flight domain of the aircraft in its configuration at the time.

19 Claims, 3 Drawing Sheets

FLIGHT MANAGEMENT COMPUTER WITH CONSIDERATION OF APPROACH SPEED CONSTRAINT

RELATED APPLICATIONS

The present application is based on, and claims priority from, French Application Number 07 01621, filed Mar. 6, 2007, the disclosure of which is hereby incorporated by reference herein in its entirety.

FIELD OF THE INVENTION

The present invention relates to the consideration, by an aircraft, of an approach speed instruction received late on the approach to a destination airport, and therefore, not given consideration in a flight plan, such as for example, those passed to the aircraft approaching an airport by the authority for controlling the traffic flow in the airspace of this airport.

BACKGROUND OF THE INVENTION

The movements of the aircraft between a departure airport and a destination airport form the subject of a preparation leading to the formulation of a more or less intricate administrative document called the flight plan which brings together a set of details concerning the progress of the flight. This flight plan, drawn up, firstly, for the benefit of the air traffic flow control authorities (airports, air traffic controls, authorities, etc.), mentions, among other information, the identity and the type of the aircraft, as well as a brief definition of the scheduled route listing a chain of waypoints, linking the takeoff runway used at the departure airport to the landing runway scheduled at the destination airport, overflight constraints associated with the waypoints, the scheduled times at which the waypoints are to be overflown, as well as, possibly, the regulatory approach procedures followed on departure and on arrival and the air corridors followed.

The piloting of an aircraft is increasingly automated. It is performed by acting on the orientations of movable surfaces (aerofoils, flaps, etc.) and on the power of the engine or engines by way of actuators receiving position instructions formulated by equipment termed the "flight controls" so as to maintain the aircraft in a given attitude, prescribed by the pilot or an autofacility.

The flight controls constitute together with the actuators a first level of equipment which is distinguished from the other levels by the fact that it involves flight equipment indispensable to the pilot for acting on the aerofoils, flaps and engines. This first level of flight equipment is often supplemented with a second and third level of flight equipment which consist of an automatic pilot/flight director and of a flight management computer easing the task of the pilot and which are distinguished from the first level of flight equipment by the fact that the pilot could, in all strictness, do without it.

The automatic pilot/flight director eases the task of the pilot in following instructions relating to heading, altitude, speed, etc. It has two possible modes of operation: "flight director" operation where it indicates to the pilot, by way of viewing screens, the orders to be given to the flight controls so as to follow an instruction, and "automatic pilot" operation where it acts in addition on the flight controls for automatic following of the parameterized instruction.

The flight management computer acts on the flight controls by way of the automatic pilot/flight director. It ensures various functions described in the ARINC 702 standard (ARINC being the acronym of the company: "Aeronautical Radio Incorporation") of December 1996 known as: "Advanced Flight Management Computer System", including:

a function for inputting the brief definition appearing in the flight plan, for the scheduled route, that is to say of the chain of waypoints linking the takeoff runway used at the departure airport to the landing runway scheduled at the destination airport with the overflight constraints associated with the waypoints and the scheduled times at which they are to be overflown as well as the departure and arrival procedures and possibly the air corridors (or airways) followed, a function for formulating a 3D trajectory taking the route to be followed defined briefly in the flight plan while complying with the performance of the aircraft and the flight constraints encountered along the 3D trajectory adopted, and a guidance function generating, by way of the automatic pilot/flight director, piloting instructions and/or orders relating to the management of the thrust of the engines and of the aerodynamic configuration of the aircraft so as to follow the 3D trajectory formulated.

During an approach phase preceding a landing, an aircraft descends in general from its cruising altitude to an intermediate altitude where it keeps a level deceleration, in the course of which it consumes its inertia until it reaches a speed compatible with a landing and aligns itself along the axis of the destination landing runway, on a descent plane allowing its wheels to touch down on entry to the runway. The trajectory of the approach phase as well as the speeds of traversal of the various portions of this trajectory often form the subject of a regulation termed the runway approach procedure defined by a series of waypoints which lead to the entrance of the chosen runway and which are associated with local flight constraints (altitudes, speed, etc.).

The flight management computer, when it has been parameterized at the start of a mission with a flight plan comprising an approach procedure for the destination landing runway, can, once its guidance function has been activated, ensure the guidance of the aircraft in the course of this approach phase, by providing the automatic pilot/flight director with the orders necessary for, on the one hand, reducing the speed of the aircraft while progressively altering its aerodynamic configuration (extension of the flaps, lift-enhancing slats, etc.) so as to retain its lift and maintain its stability at low speed and, on the other hand, passing the waypoints imposed by the regulatory approach procedure while complying with the local flight constraints associated with them.

However, it may happen that in the course of a landing field approach procedure, an aircraft receives, from the authority in charge of regulating the traffic in the airspace of the destination airport, a speed instruction not scheduled in the flight plan, justified by the necessity to insert it into the local traffic. The pilot of the aircraft must then resume control of the piloting of the aircraft if he had entrusted it to the flight management computer, and apply the speed instruction of the air traffic controller in addition to the instructions passed to him by the flight management computer through the automatic pilot/flight director, which are displayed on the onboard instruments and which are not necessarily compatible with the speed instruction of the regulating authority. This results in extra work for the pilot in a phase of the flight where the workload of the crew is already considerable. There therefore exists a requirement to ease the handling by the crew of an aircraft, of the speed instructions that they receive while they are getting ready for or are currently executing a landing runway approach procedure.

SUMMARY OF THE INVENTION

One aim of the present invention is to satisfy the aforesaid requirement.

The invention is directed to a flight management computer carried onboard an aircraft and comprising:

- means for inputting and parameterizing geographical elements and flight constraints associated with the geographical elements for defining, in a flight plan, the skeleton of a route to be followed leading to a landing runway,
- means for formulating a 3D continuous trajectory taking the route to be followed while complying with the performance of the aircraft and the flight constraints,
- guidance means ensuring the formulation of piloting instructions and/or orders relating to the management of the thrust of the engines and of the aerodynamic configuration of the aircraft for following the 3D trajectory formulated and for complying with the associated flight constraints, and
- means for inputting and parameterizing a speed constraint that is applicable in the landing runway approach phase, until the aircraft crosses a point at which the constraint ends on the 3D trajectory labelled with respect to a radio beacon.

Advantageously, the location of the point at which the constraint ends on the 3D trajectory is labelled by its distance from a radio beacon.

Advantageously, the location of the point at which the constraint ends on the 3D trajectory is labelled by its position on a radial of an omnidirectional radio beacon.

Advantageously, when the geographical location of the point at which the constraint ends on the 3D trajectory is labelled by its distance from a radio beacon, the means for inputting and parameterizing speed constraint in the approach phase input the speed constraint, the designator of the radio beacon and the distance of the point at which the constraint ends from the radio beacon.

Advantageously, when the geographical location of the point at which the constraint ends on the 3D trajectory is labelled by its distance from a radio beacon, the means for inputting and parameterizing speed constraint in the approach phase input the speed constraint, the designator of the radio beacon and the distance of the point at which the constraint ends from the radio beacon.

Advantageously, the speed constraint in the approach phase is a speed value to be complied with.

Advantageously, the speed constraint in the approach phase is a maximum speed threshold to be complied with.

Advantageously, the speed constraint in the approach phase is a minimum speed threshold to be complied with.

Advantageously, when the aircraft comprises lift-enhancing devices at intermediate deployment positions, the flight management computer exhibits an operating mode of controlling and holding the approach speed in which it adopts, as target speed, in each deployment position of the lift-enhancing devices, that of the speed constraint or of an instruction speed so as to make the lift-enhancing devices pass from their position at the time to the following more deployed position, which has the largest of the values, bounded below as required so as to remain within the limits of the flight domain of the aircraft in its configuration at the time.

Advantageously, the flight management computer generates, after crossing of the point at which the constraint ends by the aircraft, instructions and/or controls for adjusting the thrust of the engines and the aerodynamic configuration of the aircraft with a view to satisfying the flight constraints associated with the approach procedure.

Advantageously, the means for inputting and parameterizing a speed constraint that is applicable in the approach phase exhibit a pilot interface device allowing the crew of the aircraft to enter, to validate or to cancel the approach speed constraint.

Advantageously, the computer comprises means for displaying the approach speed constraint.

Advantageously, the means for displaying the approach speed constraint show this constraint on the speed scale of a screen for displaying the primary flight parameters.

Advantageously, the computer comprises means for displaying on a navigation screen, the location of the point at which the approach speed constraint ends, on the route scheduled in the flight plan.

Advantageously, the means for inputting and parameterizing a speed constraint in the approach phase are actuatable by the air traffic control from the ground, by way of a data transmission.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

a FIG. 1 represents a conventional architecture of flight management computer in its environment aboard an aircraft.

DETAILED DESCRIPTION OF PREFERRED EMBODIMENT

Figure 1:
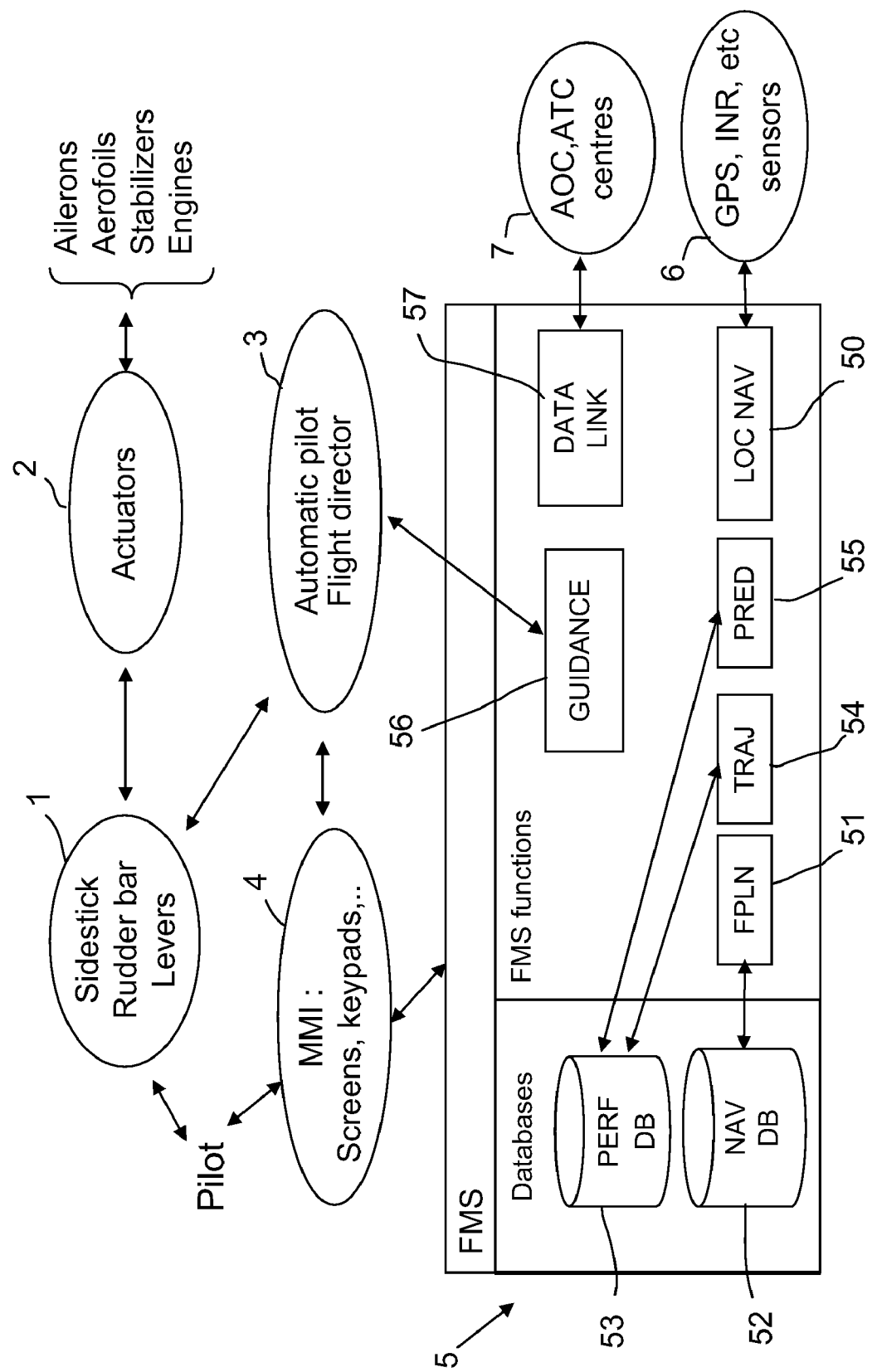

As shown in FIG. 1, to ensure the piloting of the aircraft, the pilot acts on flight controls 1 (joystick, sidestick, rudder bar, levers, etc.) that operate actuators 2 ensuring the orientations of the movable surfaces (ailerons, aerofoils, stabilizers, etc.) of the aircraft and the adjustment of the power of its engine or engines. He does so, either directly, or indirectly by means of an automatic pilot/flight director 3 that he parameterizes manually by way of a man-machine interface 4 (buttons, keypads, screens, etc.), or, in a still more indirect manner, by way of the automatic pilot/flight director 3 operated by the flight management computer 5 that he parameterizes manually, also by way of the man-machine interface 4.

The actuators 2 are themselves equipped with computers enabling them to translate the instructions received into controls suited to the mechanisms that must execute them.

The automatic pilot/flight director 3 eases the task of the pilot in the following of instructions relating to heading, altitude, speed, etc. As recalled previously, it has two possible modes of operation: flight director operation where it indicates to the pilot, by way of viewing screens, the positions of the flight controls suitable for following a particular instruction, and automatic pilot operation where it acts in addition on the flight controls 1.

The flight management computer 5 automates the tasks of formulating and following the route scheduled in a flight plan. More precisely, it ensures, when it meets the ARINC 702 standard, all or some of the functions of:

Navigation LOCNAV, 50, to perform the optimal location of the aircraft. Accordingly, it is hooked up to the sensors 6 of position (geographical and altitude), attitude and speed of the aircraft (GPS, GALILEO, VHF radio beacons, inertial platforms, altimeter, etc.);

Inputting FPLN 51 of the elements of the flight plan relating to the route to be followed (departure and arrival procedures, waypoints, local flight constraints, airways, etc.);

Navigation database NAVDB 52 bringing together the information required for the brief definition of a route in a flight plan, (locations of waypoints, of beacons, of interception or altitude segments, of regulated air corridors, regulated approach procedures, etc.);

Performance database, PERF DB 53 containing the aircraft's aerodynamic and engine parameters.

Plotting, on the basis of the waypoints of the route appearing in the flight plan, of a continuous lateral trajectory TRAJ, 54 complying with the airplane performance and the confinement constraints with respect to the chain of segments linking the waypoints;

Construction PRED, 55 of a vertical profile that is optimized on the lateral trajectory so as to terminate the plotting of a 3D trajectory appropriate to the performance of the aircraft and complying with the route defined in the flight plan;

Guidance GUID 56, in the lateral and vertical planes, of the aircraft on its 3D trajectory, while optimizing the speed;

Digital data link DATALINK, 57 to communicate with the control centres and the other aircraft 7.

During a mission preparation, the brief definition of the route scheduled in the flight plan is introduced into the flight management computer 5, by the pilot, by means of the man-machine interface 4, or by a mission preparation centre by means of the data link DATA LINK 57. This brief definition of the scheduled route takes the form of a chain of segments or "legs" reproducing a route skeleton complying with a chain of waypoints. The segments are defined individually, by a termination which is the waypoint to be reached, possible local flight constraints and a type of geometry (turn, great circle, rhumb line, etc.) standardized at the international level in an ARINC 424 document. Certain segments and waypoints are grouped together and defined globally in regulatory procedures, often approach procedures.

The pilot then enters, into the flight management computer 5, the parameters of the aircraft (mass, cruising levels, optimization criteria, etc.) allowing the plotting function TRAJ 54 and construction function PRED 55 to calculate a 3D trajectory taking account of the performance of the aircraft and that best follows the route skeleton initially introduced.

After having validated the proposed 3D trajectory, the pilot can activate the guidance function GUID 56 to entrust the flight management computer 5 with the control of the automatic pilot/flight director 3, either in simple flight director mode to obtain on the onboard screens, indications on the instantaneous positions of the onboard controls suitable for following the validated 3D trajectory, or in automatic pilot mode to obtain, in addition, automatic following, by the aircraft, of the validated 3D trajectory.

For a landing runway approach, the function PRED 55 of the flight management computer 5 in general adopts a vertical reference profile comprising three successive phases:

a first phase of descent at constant speed and slope (between −2 and −3 degrees) allowing the aircraft to leave the cruising altitude and attain an intermediate altitude of the order of 3000 feet, a second phase of deceleration at horizontal hold in the course of which the aircraft progressively reaches its nominal landing speed and aligns itself with the runway axis and a final third phase of descent with a slope of −3 degrees leading the aircraft's wheels to touch down on entry to the runway.

During the first descent phase, the flight management computer 5 with its guidance function activated, parameterizes the automatic pilot/flight director 3 for a descent at constant speed and slope until the intermediate altitude is obtained. During this flight phase, the automatic pilot/flight director 3 gives at each instant to the pilot, by way of the screens of the flight deck, indications on the errors in descent slope and speed. When it operates in "automatic pilot" mode, it acts in addition directly on the flight controls so as to cancel these errors.

Once the intermediate altitude has been reached, the flight management computer 5 with its guidance function activated, parameterizes the automatic pilot/flight director 3 for holding a horizontal level and a succession of target speeds corresponding to ever lower instruction speeds appropriate for the deployment by steps, of the lift-enhancing devices allowing the aircraft to retain its lift and its stability at low speed, the last target speed being the nominal speed for final approach obtained with the lift-enhancing devices fully open. Whenever an instruction speed for passing from the position at the time of the lift-enhancing devices to a more deployed position is reached, the flight management computer maintains this speed so long as the lift-enhancing devices have not passed to a more deployed position, either under the control of the pilot, or under that of the automatic pilot/flight director.

In the course of this level deceleration, the guidance function of the flight management computer 5 gives the pilot, at each instant, by way of the automatic pilot/flight director 3 and of the screens of the flight deck, indications on the altitude error and on the optimal positions (extension settings) of the lift-enhancing devices (slat and flaps) corresponding to the instantaneous speed of the aircraft. When the automatic pilot/flight director 3 operates in automatic pilot mode, it acts in addition on the flight controls so as to cancel the altitude error and place the lift-enhancing devices in the proper positions.

The indications of the optimal positions of extension of the lift-enhancing devices consist, in general, of distinctive marks appearing on or alongside the speed indicator of a PFD screen displaying the primary flight parameters. Thus, for a transport aircraft with jets exhibiting three intermediate flap positions, during an active approach phase in the smooth configuration, the automatic pilot/flight director in "managed speed" mode decreases the speed of the aircraft down to a first threshold (about 200 Kt), usually labelled by a green circle on the speed indicator marking the permitted minimum speed for a smooth configuration, and retains this target speed pending extension of a first flap setting. Right from the extension of a first flap setting, the automatic pilot/flight director in "managed speed" mode again decreases the speed of the aircraft to a second threshold (about 180 Kt), usually labelled by a letter S on the speed indicator marking the permitted minimum speed for a first flap setting, and retains this target speed pending extension of other settings. Right from the extension of a second flap setting, the automatic pilot/flight director in "managed speed" mode again decreases the speed of the aircraft to a third threshold (about 150 Kt), usually labelled by a letter F on the speed indicator marking the permitted minimum speed for a second flap setting, and retains this target speed F pending extension of the third and the fourth and last flap settings of the aircraft. After which, it adopts the nominal final approach speed as target speed.

When a flight management computer of the prior art has its guidance function activated during the approach phase and a speed instruction is received by the aircraft for traffic regulating reasons on landing, the pilot must interrupt the "automatic pilot" function of the automatic pilot/flight director if it is engaged and ensure piloting manually by giving consideration to this new constraint while he is searching for the nominal final approach speed and has furthermore to concern himself with the altitude constraint of the holding flight, the crossings of the speed thresholds for changing adjustment of the lift-enhancing devices and possibly the overflying of the waypoints corresponding to these changes of adjustment.

To spare the pilot from this work overload, it is proposed to furnish a flight management computer with means for inputting and considering a speed constraint in the approach phase by modifying the target speeds in the approach phase of the guidance function up to a point at which constraint application ends, placed downstream on the 3D trajectory portion remaining to be traversed or on the route portion corresponding thereto in the flight plan, and labelled geographically by means of the radio beacons.

Figure 2:
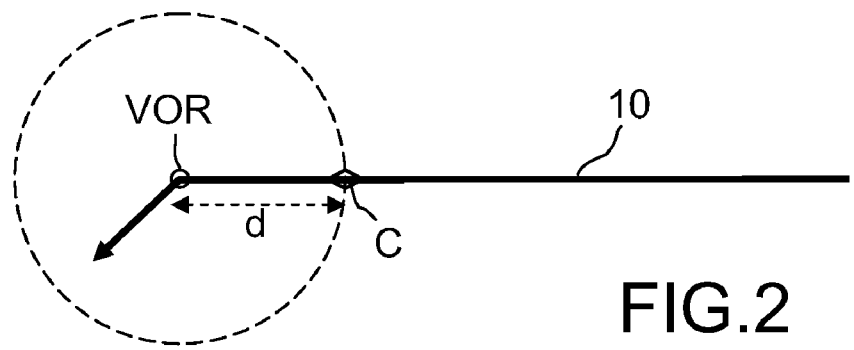
FIGS. 2 and 3 are diagrams explaining two ways of geographically locating a point at which the speed constraint ends with respect to radio beacons, a FIG. 4 represents an exemplary screen for inputting an approach speed constraint displayed by a flight management computer in accordance with the invention, and a FIG. 5 represents a logic chart illustrating a consideration of an approach speed constraint by a guidance function of a flight computer in accordance with the invention.
Figure 3:
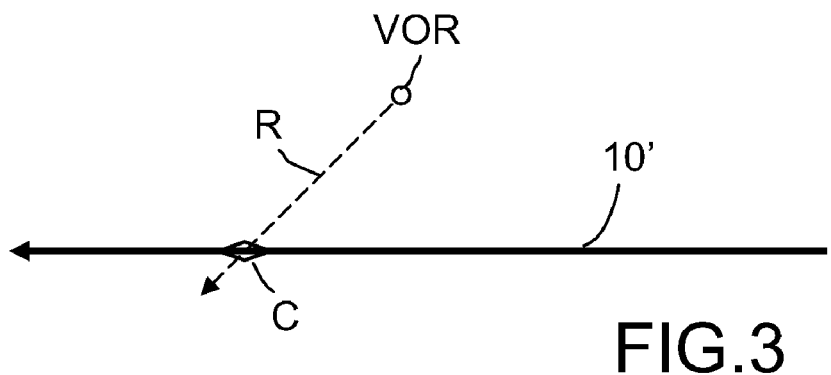

The location of the point at which the approach speed constraint ends C can be labelled on the 3D trajectory remaining to be traversed or on the route 10 corresponding thereto in the flight plan, either, as shown in FIG. 2, by its distance d with respect to a radio beacon VOR placed in this example on the ground plot of the 3D trajectory remaining to be traversed, or, as shown in FIG. 3, by the intersection of the route 10' remaining to be traversed with a radial of an omnidirectional radio beacon VOR shifted with respect to the route 10 remaining to be traversed.

When, as represented in FIG. 2, the point at which the approach speed constraint ends C is labelled on the route 10 of the flight plan remaining to be traversed by a distance with respect to a radio beacon, it is identified at the flight management computer level by the designator of the radio beacon and by the distance from the radio beacon. The radio beacon can be a non-directional radio beacon NDB, an omnidirectional radio beacon VOR or a directional radio beacon ILS. The distance from the radio beacon is, in general, measured by DME equipment associated with the radio beacon.

When, as represented in FIG. 3, the point at which the approach speed constraint ends C is labelled on the route 10' of the flight plan remaining to be traversed by its location on a radial of an omnidirectional radio beacon, it is identified at the flight management computer level by the designator of the omnidirectional radio beacon VOR and the orientation of the radial.

The point at which the approach speed constraint ends can form the subject of a marker affixed to the plot of the route of the flight plan remaining to be traversed and displayed on a navigation screen so that the pilot knows the time at which the approach speed constraint ceases to have to be considered and at which the approach resumes under normal conditions.

Figure 4:
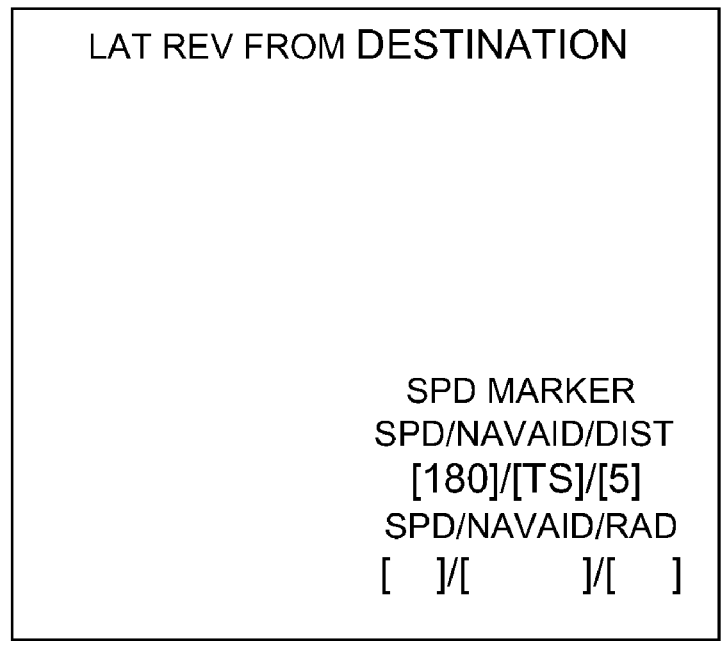

FIG. 4 illustrates an exemplary screen for inputting an approach speed constraint and the point at which its application ends, which can be displayed for example by an MCDU item of equipment (acronym of the expression "Multi-Function Control Display Unit") belonging to the man-machine interface 4. This screen can appear after a key rest on the last waypoint of the active flight plan, which is the destination and whose rubric appears in bold characters in FIG. 4. An "SPD MARKER" rubric in bold characters in FIG. 4 makes it possible to input an approach speed constraint "SPD" here "+180 Kt" associated with the coordinates of a point at which application of the constraint ends, placed on the 3D trajectory remaining to be traversed taking the form of a radio beacon designator "NAVAID" here "TS" and, either of a distance from the radio beacon "DIST" here "5 nauticals", or of the orientation of a radial "RAD". The sign+preceding the approach speed constraint signifies that this is a minimum speed, it might not appear, signifying that this is a precise speed to be complied with or it could be replaced with a minus sign, signifying that this is a maximum speed to be complied with.

Figure 5:
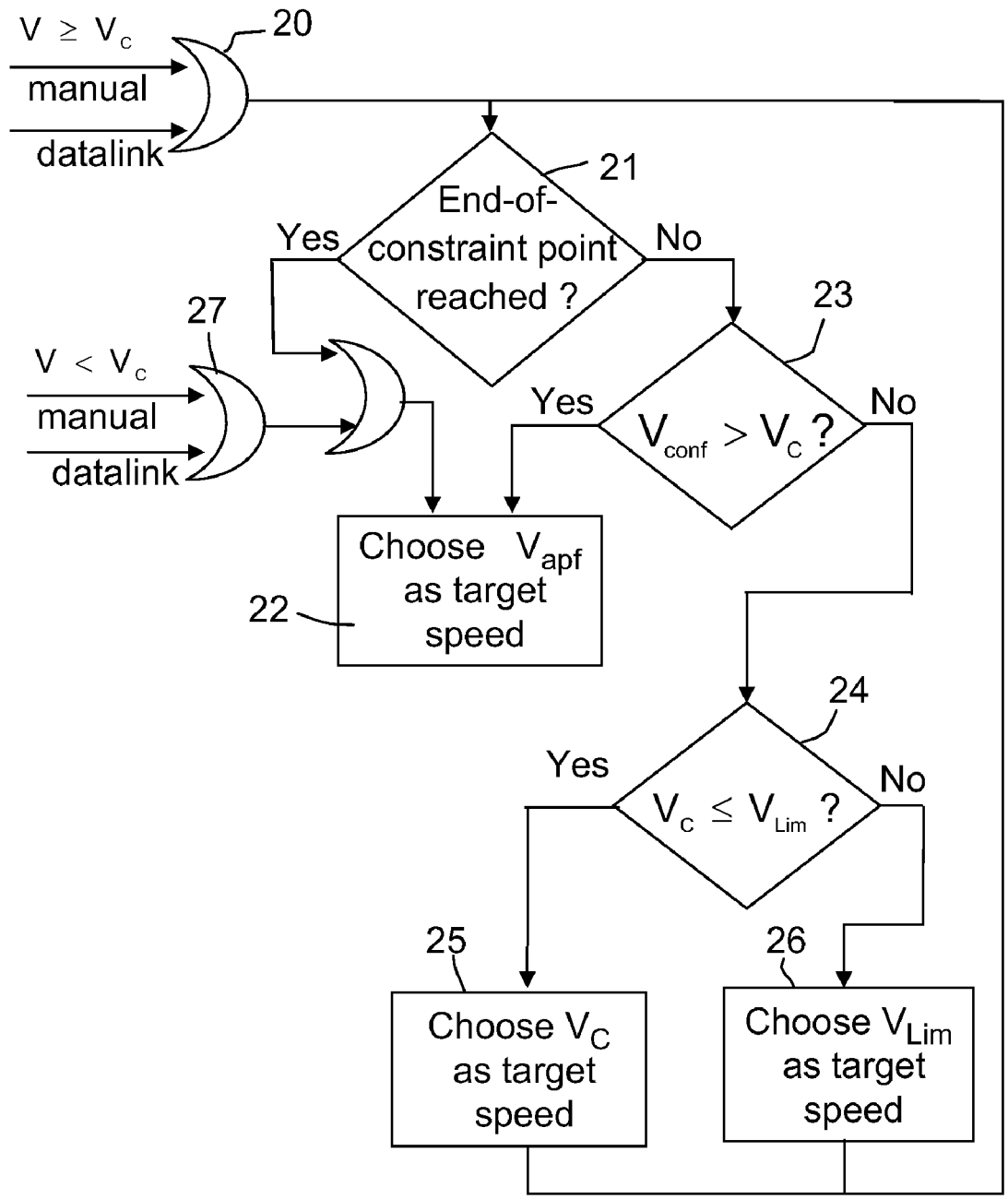

FIG. 5 illustrates the choice of target speed made by the flight management computer's guidance function when it is activated and considers a newly apparent approach speed constraint.

A speed or minimum speed constraint introduced at 20, manually by the pilot or in an automatic manner by the "datalink" data transmission link, leads the guidance function to test at 21 whether or not the aircraft has passed on its trajectory the point at which the constraint ends.

If the point at which the constraint ends has been passed, the guidance function ignores the constraint and retains, at 22, as target speed, the speed $V_{conf}$ appropriate to the current configuration and to the next step of deployment of the lift-enhancing devices.

If the point at which the constraint ends is not yet passed, the guidance function tests at 23, whether the speed $V_{conf}$ appropriate to the current configuration and to the next step of deployment of the lift-enhancing devices is greater than or equal to the speed constraint $V_C$.

When the speed $V_{conf}$ appropriate to the current configuration and to the next step of deployment of the lift-enhancing devices is greater than or equal to the speed constraint $V_C$, the guidance function retains, at 22, as target speed, the speed $V_{conf}$ appropriate to the current configuration and to the next step of deployment of the lift-enhancing devices.

When the speed $V_{conf}$ appropriate to the current configuration and to the next step of deployment of the lift-enhancing devices is less than the speed constraint $V_C$, the guidance function tests at 24, whether the speed constraint $V_C$ is less than or equal to a limit speed $V_{Lim}$ imposed by the flight domain corresponding to the configuration of the aircraft at the time.

If the speed constraint $V_C$ is less than or equal to the limit speed $V_{Lim}$ imposed by the flight domain corresponding to the configuration of the aircraft at the time, the guidance function adopts at 25, as target speed, the speed constraint $V_C$.

If the speed constraint $V_C$ is greater than the limit speed $V_{Lim}$ imposed by the flight domain corresponding to the configuration of the aircraft at the time, the guidance function adopts at 26, as target speed, the limit speed $V_{Lim}$ so as to remain within the limits of the flight domain corresponding to the configuration of the aircraft at the time.

Should the speed be limited to a lower value of the speed or minimum speed constraint so as to remain in the flight domain corresponding to the configuration of the aircraft at the time, the target speed adopted, which is at the upper limit of the flight domain, is accompanied by a directive for the lift-enhancing devices to pass to a more retracted position, displayed on the onboard screens by the automatic pilot/flight director, the latter even going so far as to execute this directive if it is operating in automatic pilot mode.

When the point at which the constraint ends is passed, the guidance function reverts to the instruction speed $V_{conf}$ as target speed.

A maximum speed constraint introduced at 27, manually by the pilot or in an automatic manner by the "datalink" data transmission link, leads the guidance function to retain at 22 as target speed, the instruction speed $V_{conf}$ appropriate to the current configuration and to the next step of deployment of the lift-enhancing devices.

The effect of considering an approach speed constraint in the manner described above emerges clearly from the following exemplary concrete case.

Imagine an aircraft in a landing runway approach phase with a system of lift-enhancing flaps having four positions: a retracted position or smooth configuration, a first intermediate flap extension setting to be adopted for a speed below 205 Kt for the mass considered, a second intermediate flap extension setting to be adopted for a speed below 190 Kt for the mass considered and a position of complete extension of the flaps to be adopted for a speed below 175 Kt.

In the normal approach phase, with no speed constraint, the activated guidance function of the flight management computer parameterizes the automatic pilot/flight director in speed holding mode with a target speed of 205 Kt corresponding to the instruction speed of extension of the first flap setting. The pilot then sees on the scrolling scale of his speed counter the instantaneous speed decrease to a value of 205 Kt marked by a first label, a green dot, indicating to him that he must extend a first flap setting. The extension of the first flap setting brings about a change by the guidance function of the target speed of the automatic pilot/flight director which passes to the value of 185 Kt corresponding to the instruction speed of extension of the second flap setting. The pilot then sees the instantaneous speed continue to decrease to the value of 185 Kt marked on the scrolling scale of the speed counter by a label S specifying that a second flap setting must be extended. The extension of the second flap setting brings about a change by the guidance function, of the target speed of the automatic pilot/flight director which passes to the value of 173 Kt corresponding to the instruction speed of total extension of the flaps. The pilot then sees the instantaneous speed continue to decrease to the value of 173 Kt marked by a label F specifying that the flaps must be completely extended. The complete extension of the flaps brings about a change by the guidance function of the target speed of the automatic pilot/flight director which passes to the value of 150 Kt corresponding to the nominal final approach speed.

Should the flight management computer input an approach speed constraint of 180 Kt up to 4 Nm from a radio beacon marking the start of the landing runway, the computer replaces on each occasion, in the choice of the target speed of the automatic pilot/flight director, the instruction speed of extension of the following flap setting, with the speed constraint as soon as it is greater than it. Thus, in this example, the flight management computer reacts, as in a normal approach, for the extension of the first and second flap settings. On the other hand, after the extension of the second flap setting, the guidance function parameterizes the automatic pilot/flight director for the holding of the speed constraint of 180 Kt and not for the attainment of the speed of 175 Kt marking the total extension of the flaps and keeps this target speed so long as the aircraft has not reached 4 Nm from the runway entrance. Past this point, the guidance function of the flight management computer parameterizes the target speed of the automatic pilot/flight director with the speed of 175 Kt corresponding to the instruction speed of total extension of the flaps.

The flight management computer reacts, for a minimum approach speed constraint, in the same manner as if dealing with a precise speed constraint equal to the indicated minimum value.

The flight management computer takes no account of a maximum speed constraint, insofar as the deceleration followed corresponds to the maximum deceleration permitted within the framework of the protection of the flight envelope.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A flight management computer carried onboard an aircraft, the computer comprising:
    an input unit for inputting and parameterizing geographical elements and flight constraints associated with the geographical elements for defining, in a flight plan, a skeleton of a route to be followed leading to a landing runway;
    a formulating unit for formulating a three-dimensional continuous trajectory taking the route to be followed while complying with performance of the aircraft and the flight constraints;
    a guidance unit for ensuring formulation of piloting instructions and/or orders relating to management of thrust of engines and of an aerodynamic configuration of the aircraft that includes lift-enhancing devices at intermediate deployment positions for following the three-dimensional continuous trajectory formulated and for complying with the associated flight constraints;
    an input and parameterize unit for inputting and parameterizing a speed constraint that is applicable in a landing runway approach phase, until the aircraft crosses a point at which the speed constraint ends, the point being labelled on the three-dimensional continuous trajectory with respect to a radio beacon,
    wherein in an operating mode of controlling and holding an approach speed, the guidance unit is configured for choosing the maximum speed value between the speed constraint and an instruction speed as a target speed in each of the intermediate deployment positions of the lift-enhancing devices, the instruction speed being appropriate to a configuration of deployment of lift-enhancing devices.

2. The computer according to claim 1, wherein a location of the point at which the speed constraint ends on the three-dimensional continuous trajectory is labelled by its distance with respect to the radio beacon.

3. The computer according to claim 1, wherein a location of the point at which the speed constraint ends on the three-dimensional continuous trajectory is labelled by its position on a radial of an omnidirectional radio beacon.

4. The computer according to claim 2, wherein the input and parameterize unit for inputting and parameterizing the speed constraint in the landing runway approach phase inputs the speed constraint, a designator of the radio beacon, and a distance of the point at which the constraint ends from the radio beacon.

5. The computer according to claim 3, wherein the input and parameterize unit for inputting and parameterizing the speed constraint in the landing runway approach phase inputs the speed constraint, a designator of the radio beacon, and an orientation of the radial emanating from the radio beacon.

6. The computer according to claim 1, wherein the speed constraint in the landing runway approach phase is a speed value to be complied with.

7. The computer according to claim 1, wherein the speed constraint in the landing runway approach phase is a maximum speed threshold to be complied with.

8. The computer according to claim 1, wherein the speed constraint in the landing runway approach phase is a minimum speed threshold to be complied with.

9. The computer according to claim 1, wherein
the maximum speed between the speed constraint or the instruction speed is chosen by the guidance unit for making the lift-enhancing devices pass from their positions at the time to the following more deployed position.

10. The computer according to claim 1, wherein, after the aircraft crosses the point at which the speed constraint ends, the flight management computer generates instructions and/or controls for adjusting thrust of engines and an aerodynamic configuration of the aircraft with a view to satisfying the flight constraints associated with an approach procedure.

11. The computer according to claim 1, wherein the input and parameterize unit for inputting and parameterizing the speed constraint that is applicable in the landing runway approach phase exhibits a pilot interface device allowing a crew of the aircraft to enter to validate or to cancel the speed constraint.

12. The computer according to claim 1, further comprising a display unit for displaying the speed constraint.

13. The computer according to claim 12, wherein the display unit for displaying the speed constraint shows the speed constraint on a speed scale of a screen for displaying primary flight parameters.

14. The computer according to claim 1, further comprising a display unit for displaying, on a navigation screen, a location of the point at which the speed constraint ends.

15. The computer according to claim 1, wherein the input and parameterize unit for inputting and parameterizing the speed constraint in the landing runway approach phase is actuatable by an air traffic control from the ground, by way of a data transmission.

16. A method of guiding an aircraft, the method comprising:
testing whether the aircraft passes, on a three-dimensional continuous trajectory, a point at which a speed constraint ends;
if the aircraft passes the point, ignoring the speed constraint and retaining an instruction speed as a target speed, the instruction speed being appropriate to a configuration and to a next step of deployment of lift-enhancing devices, the lift-enhancing devices being included in the aircraft at intermediate deployment positions;
if the aircraft does not pass the point, testing whether the instruction speed is greater than or equal to the speed constraint;
when the instruction speed is greater than or equal to the speed constraint, retaining the constraint speed as the target speed;
when the instruction speed is less than the speed constraint, testing whether the speed constraint is less than or equal to a limit speed, the limit speed being imposed by a flight domain corresponding to a configuration of the aircraft;
if the speed constraint is less than or equal to the limit speed, commanding the aircraft to adopt the speed constraint as the target speed; and
if the speed constraint is greater than the limit speed, commanding the aircraft to adopt the limit speed as the target speed.

17. The method according to claim 16, further comprising:
after commanding the aircraft to adopt the speed constraint or the limit speed as the target speed, when the aircraft passes the point, reverting the target speed to the instruction speed.

18. The method according to claim 16, wherein the method is performed according to a request from a pilot of the aircraft.

19. The method according to claim 16, wherein the method is performed in an automatic manner.

* * * * *